United States Patent
Lin et al.

(10) Patent No.: US 10,833,740 B1
(45) Date of Patent: Nov. 10, 2020

(54) SYSTEMS AND METHODS FOR COARSE SCAN BEAMFORMING USING SUBARRAYS

(71) Applicant: Apple Inc., Cupertino, CA (US)

(72) Inventors: Chia-Feng Lin, San Jose, CA (US); Qishan Yu, San Jose, CA (US); Berke Cetinoneri, Santa Clara, CA (US); Xueting Liu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/516,518

(22) Filed: Jul. 19, 2019

(51) Int. Cl.
*H04B 7/04* (2017.01)
*H04B 7/0456* (2017.01)
*H04B 7/06* (2006.01)

(52) U.S. Cl.
CPC ......... *H04B 7/0473* (2013.01); *H04B 7/0617* (2013.01); *H04B 7/0682* (2013.01)

(58) Field of Classification Search
CPC ... H04B 7/0473; H04B 7/0617; H04B 7/0682
See application file for complete search history.

(56) References Cited

U.S. PATENT DOCUMENTS

| 9,516,563 | B2 | 12/2016 | Maltsev et al. |
| 2013/0057432 | A1 | 3/2013 | Rajagopal et al. |
| 2014/0018004 | A1* | 1/2014 | Li ............... H04W 72/046 455/63.4 |
| 2014/0050280 | A1* | 2/2014 | Stirling-Gallacher ............ H04B 7/0469 375/296 |
| 2018/0351260 | A1 | 12/2018 | Li et al. |
| 2019/0013847 | A1 | 1/2019 | Kim et al. |

* cited by examiner

*Primary Examiner* — Kabir A Timory
(74) *Attorney, Agent, or Firm* — Fletcher Yoder, P.C.

(57) ABSTRACT

A communication device has multiple antennas in an antenna array, and applies the same input power to each antenna. A controller of the communication device instructs phase shifters to form a first subarray with a first pair of the antennas and a second subarray with a second pair of the antennas. The controller causes the first subarray to generate a first beam and causes the second subarray to generate a second beam, wherein the first beam combines in phase with the second beam to generate a coarse beam. The coarse beam may have increased beam width while exhibiting decreased peak gain loss.

20 Claims, 10 Drawing Sheets

SYSTEMS AND METHODS FOR COARSE SCAN BEAMFORMING USING SUBARRAYS

BACKGROUND

The present disclosure relates generally to wireless communication systems and, more specifically, to enabling a wireless communication device to communicate with a base station.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The $3^{rd}$ Generation Partnership Project (3GPP) standards organization finalized the Release-15 cellular communication standard in June 2018 with the 5th Generation (5G) specifications that include a new millimeter wave (mmWave) frequency range (e.g., 24.25-300 gigahertz (GHz)), which may be used to achieve increased throughput. Communicating using the mmWave frequency range may result in high energy loss in propagation, and, as such, typically requires using multiple antennas and beam-forming techniques to communicate with a base station. The directional nature of beam-forming provides a strong antenna array gain at the cost of weak coverage in space; hence a communication device (e.g., a smartphone) typically quickly switches beam directions to search for the base station. The 3GPP defines two sets of search schemes: a first "Coarse Search" that uses wider beams to locate the base station, and then a second "Fine Search" that uses narrow beams to focus the energy at the located base station to exchange data with the base station.

To instruct the antennas of the communication device to form beams, a radio frequency integrated circuit of the communication device may include a codebook that stores beam settings called "codewords". That is, each codeword corresponds to a directional beam that may be formed by one or more antennas of the communication device. However, the codebook stores a large number of codewords corresponding to multiple directional coarse beams used to locate the base station, and multiple directional narrow beams used to connect with the base station in different directions to exchange data with the base station, which may take up a significant portion of memory space in the radio frequency integrated circuit, and enlarge the physical blueprint of the radio frequency integrated circuit.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below The presently disclosed systems and methods include dividing an antenna array (e.g., multiple antennas) of a communication device into subarrays. For example, if the communication device has an antenna array having four antennas, a controller of a radio frequency integrated circuit of the communication device may divide the antenna array into two subarrays of two antennas each. The controller may instruct each subarray to form a respective beam by sending beam setting information from a codebook (that stores beam settings called "codewords") of a radio frequency integrated circuit to each antenna. The respective beams may be combined in phase to generate a coarse beam that is used to locate the base station.

In particular, the controller may instruct the antennas of the antenna array to generate the coarse beam to increase the beam width of the coarse beam, while maintaining an increased gain. For example, communication device may include at least four antennas. The controller may apply the same input power to each antenna, form a first subarray with a first pair of antennas, and form a second subarray with a second pair of antennas. In particular, the controller may cause the first subarray to generate a first beam and cause the second subarray to generate a second beam, wherein the first beam combines in phase with the second beam to generate the coarse beam.

The resulting generated coarse beam may have reduced peak gain loss when compared to applying the same input power to each antenna without forming such subarrays (e.g., on the scale of 3 decibels). Moreover, the beam width of the coarse beam may be significantly greater than that realized when applying the same input power to each antenna without forming such subarrays (e.g., on the scale of 2.5 times greater than that realized when applying the same input power to each antenna without forming such subarrays). In one case, the beam width of the antenna array when applying the same input power to each antenna without forming subarrays (e.g., thus generating a reference beam) is 36°, and the peak gain may be scaled to 0 dB. When applying the same input power and forming subarrays, the resulting beam width is 104°, and the resulting peak gain is −3 dB (when compared to the peak gain of the reference beam), respectively.

Advantageously, due to the increased beam width when applying the same input power to and forming subarrays from the antennas of an array, beam-switching may be reduced or altogether unnecessary when attempting to detect a base station beam, thus decreasing detection time. Moreover, the codebook of the communication device may store a reduced number of codewords or beam settings for coarse beams, resulting in a smaller and more streamlined codebook, which may advantageously reduce the size of the radio frequency integrated circuit storing the codebook. For example, in the case of the communication device having three antenna arrays of four antennas each, as little as 12 to 24 codewords may be stored for each antenna array to provide spherical coverage. That is, as little as 36 to 72 codewords may be stored for the antenna arrays in the codebook for generating the coarse beams.

Embodiments described herein are directed to multi-radio devices, and methods of operation thereof, in which the management of the transmission powers is based on the network and/or the antenna location. In some embodiments, the location information may be encoded in messages that distinguish groups (e.g., group-by-group basis management of power). In some embodiments, the location information may be encoded in messages that distinguish individual antennas (e.g., antenna-by-antenna basis management of power). Combination of group-by-group and antenna-by-antenna management may also be employed for different networks.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
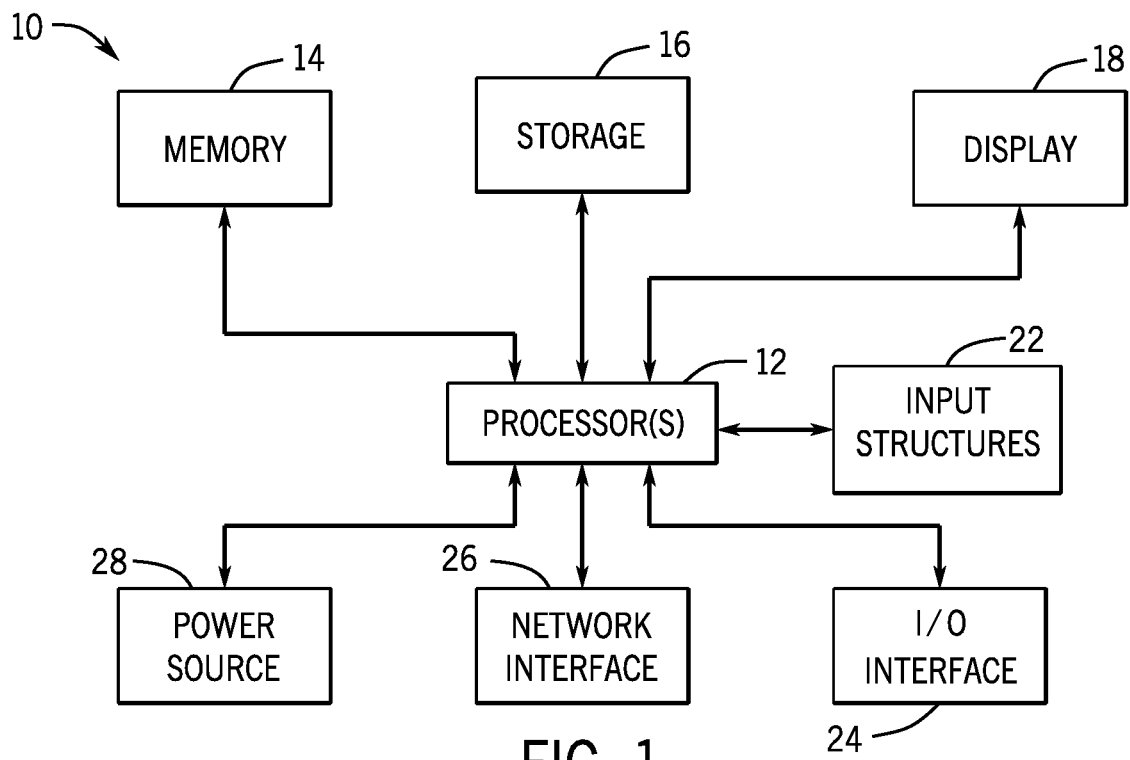
FIG. 1 is a block diagram of an electronic device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The $3^{rd}$ Generation Partnership Project (3GPP) standards organization finalized the Release-15 cellular communication standard in June 2018 with the 5th Generation (5G) specifications that include a new millimeter wave (mmWave) frequency range (e.g., 24.25-300 gigahertz (GHz)), which may be used to achieve increased throughput. Communicating using the mmWave frequency range may result in high energy loss in propagation, and, as such, typically requires using multiple antennas and beam-forming techniques to communicate with a base station. The directional nature of beam-forming provides a strong antenna array gain at the cost of weak coverage in space; hence a communication device (e.g., a smartphone) typically quickly switches beam directions to search for the base station. The 3GPP defines two sets of search schemes: a first "Coarse Search" that uses wider beams to locate the base station, and then a second "Fine Search" that uses narrow beams to focus the energy at the located base station to exchange data with the base station.

To instruct the antennas of the communication device to form beams, a radio frequency integrated circuit of the communication device may include a codebook that stores beam settings called "codewords". That is, each codeword corresponds to a directional beam that may be formed by an antenna array of the communication device. However, the codebook may store a large number of codewords corresponding to multiple directional coarse beams used to locate the base station, and multiple directional narrow beams used to connect with the base station in different directions to exchange data with the base station, which may take up a significant portion of memory space in the radio frequency integrated circuit, and enlarge the physical blueprint of the radio frequency integrated circuit.

The presently disclosed systems and methods are directed at generating a coarse beam with increased beam width while exhibiting decreased peak gain loss. For example, a communication device may have multiple antennas in an antenna array, and apply the same input power to each antenna. A controller of the communication device may instruct phase shifters to form a first subarray with a first pair of the antennas and a second subarray with a second pair of the antennas. In particular, the controller may cause the first subarray to generate a first beam and cause the second subarray to generate a second beam, wherein the first beam combines in phase with the second beam to generate the coarse beam. When compared to applying the same input power to each antenna without forming such subarrays, the beam width of the coarse beam may be at least 2.5 times greater. Moreover, the peak gain of the coarse beam may be at most 3.5 decibels (dB) less than the peak gain of the antenna array when applying the same input power to each antenna without forming the subarrays.

Advantageously, due to the increased beam width, beam-switching may be reduced or altogether unnecessary when attempting to detect a base station beam, thus decreasing detection time. Moreover, the codebook of the communication device may store a reduced number of codewords or beam settings for coarse beams, resulting in a smaller and more streamlined codebook, which may advantageously reduce the size of the radio frequency integrated circuit.

With the foregoing in mind, there are many suitable communication devices that may benefit from the embodiments for generating coarse beams with increased beam width and decreased peak gain loss described herein. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
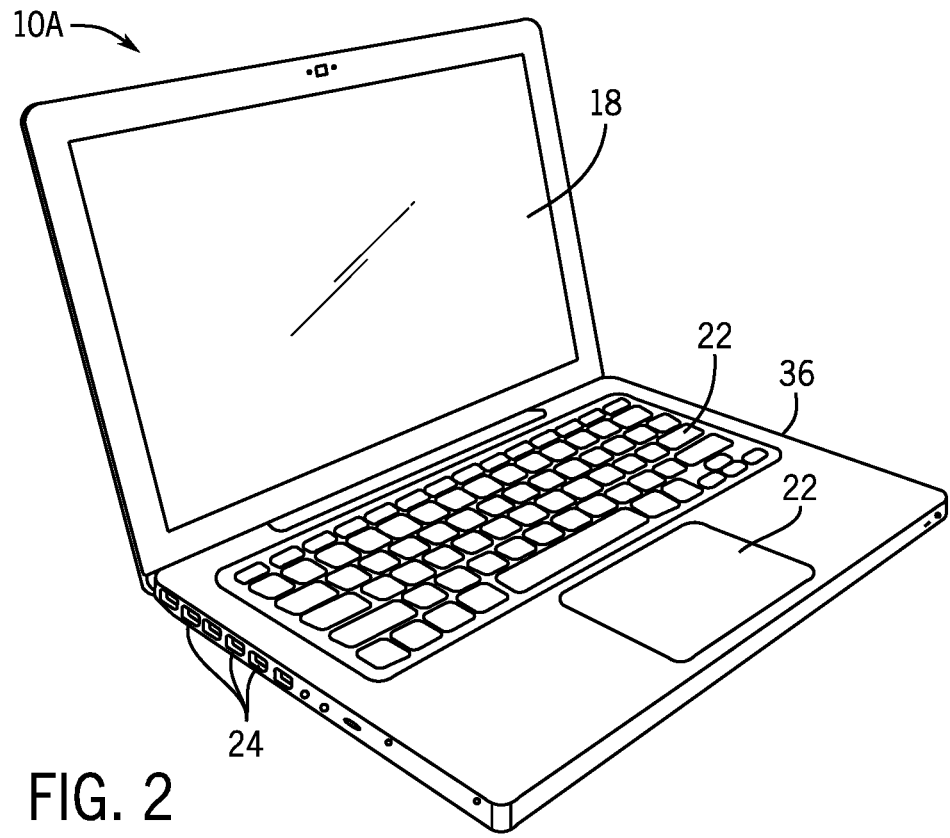
FIG. 2 is a perspective view of a notebook computer representing an embodiment of the electronic device of FIG. 1.
Figure 4:
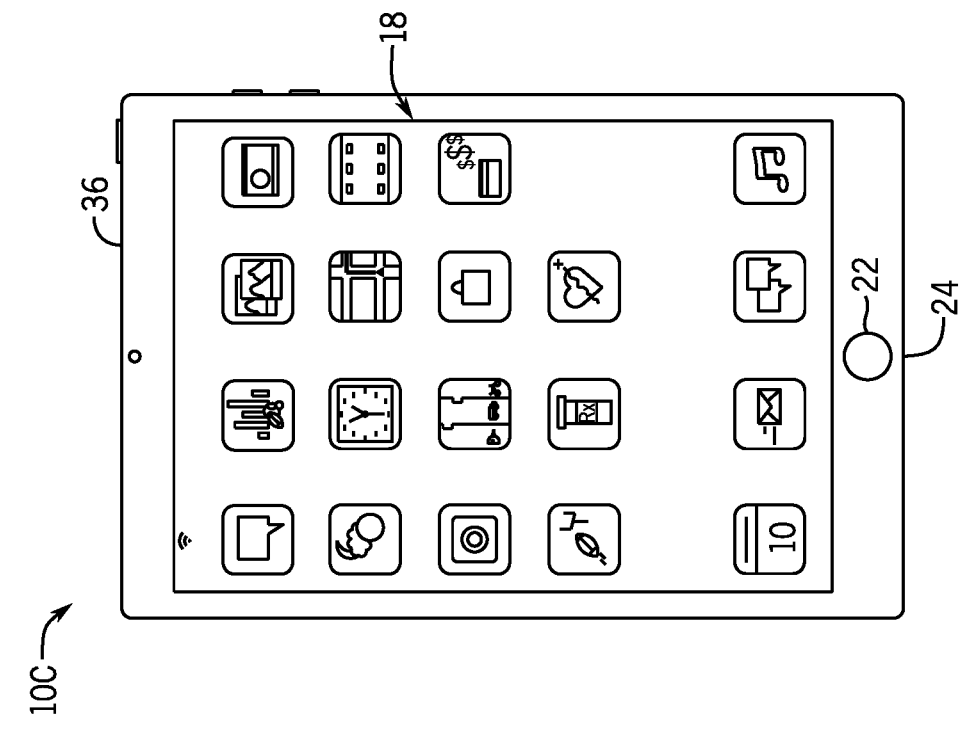
FIG. 4 is a front view of another hand-held device representing another embodiment of the electronic device of FIG. 1.
Figure 3:
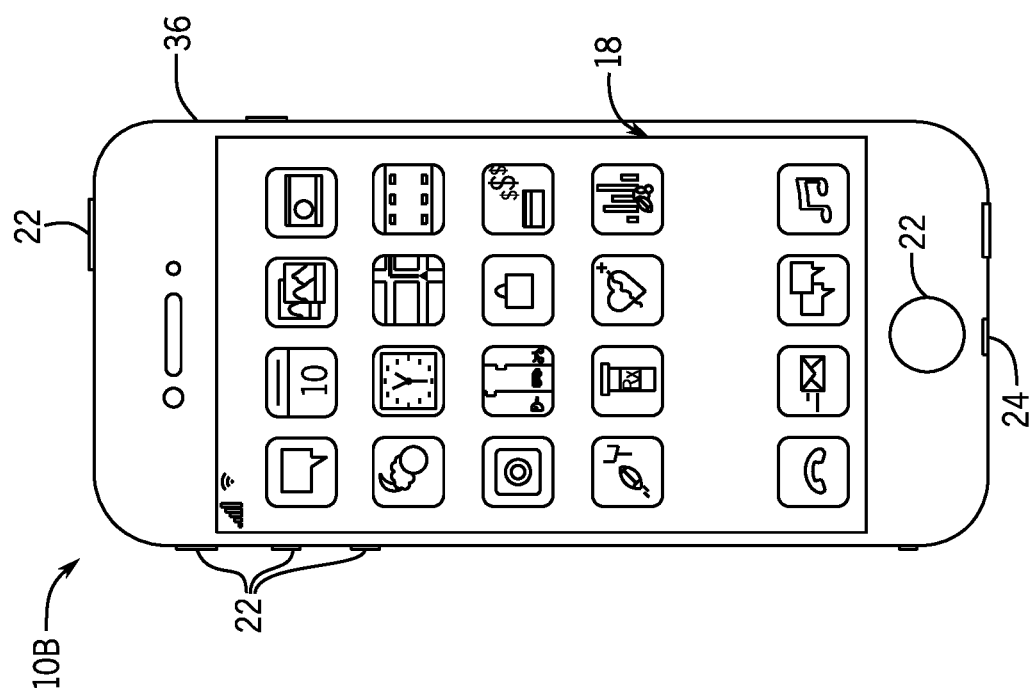
FIG. 3 is a front view of a hand-held device representing another embodiment of the electronic device of FIG. 1.
Figure 5:
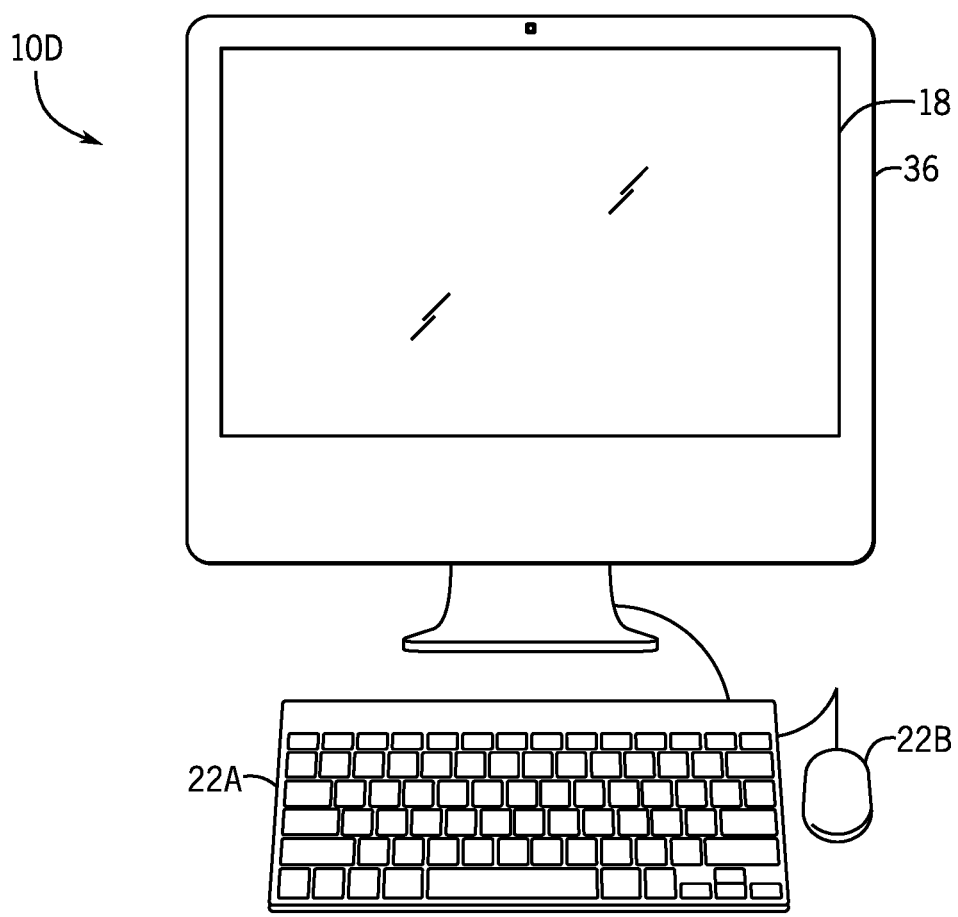
FIG. 5 is a front view of a desktop computer representing another embodiment of the electronic device of FIG. 1.
Figure 6:
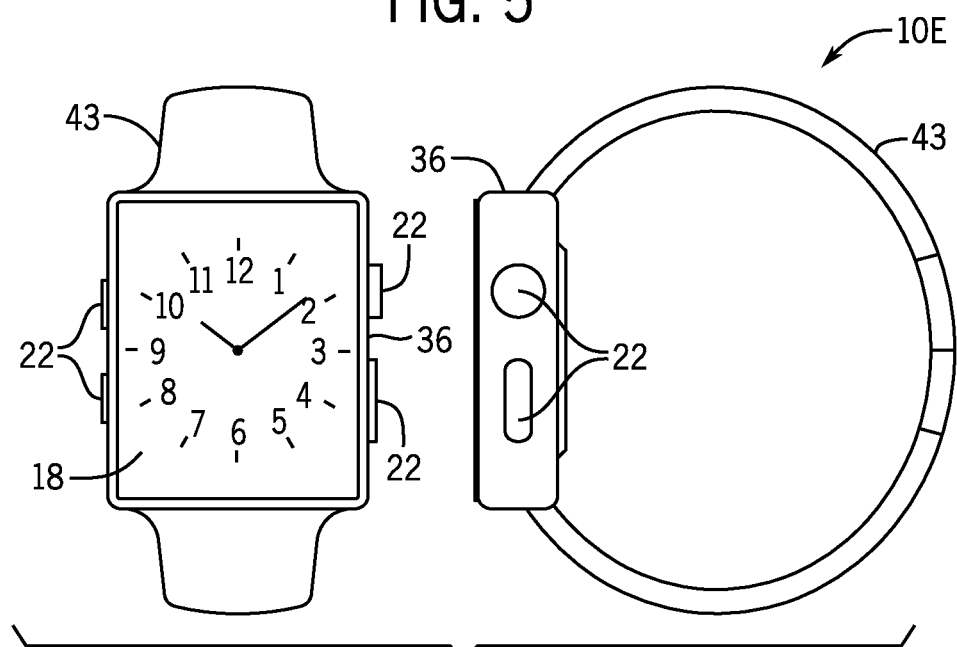
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be embodied wholly or in part as software, firmware, hardware, or any combination thereof. Furthermore, the processor(s) 12 and other related items in FIG. 1 may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, universal mobile telecommunication system (UMTS), 4th generation (4G) cellular network, long term evolution (LTE) cellular network, or long term evolution license assisted access (LTE-LAA) cellular network, 5th generation (5G) cellular network, and/or 5G New Radio (5G NR) cellular network. In particular, the network interface 26 may include, for example, one or more interfaces for using the Release-15 cellular communication standard of the 5G specifications that include the millimeter wave (mmWave) frequency range (e.g., 24.25-300 GHz).

The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth. As further illustrated, the electronic device 10 may include a power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc., a universal service bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices 22, such as the keyboard 22A or mouse 22B, which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
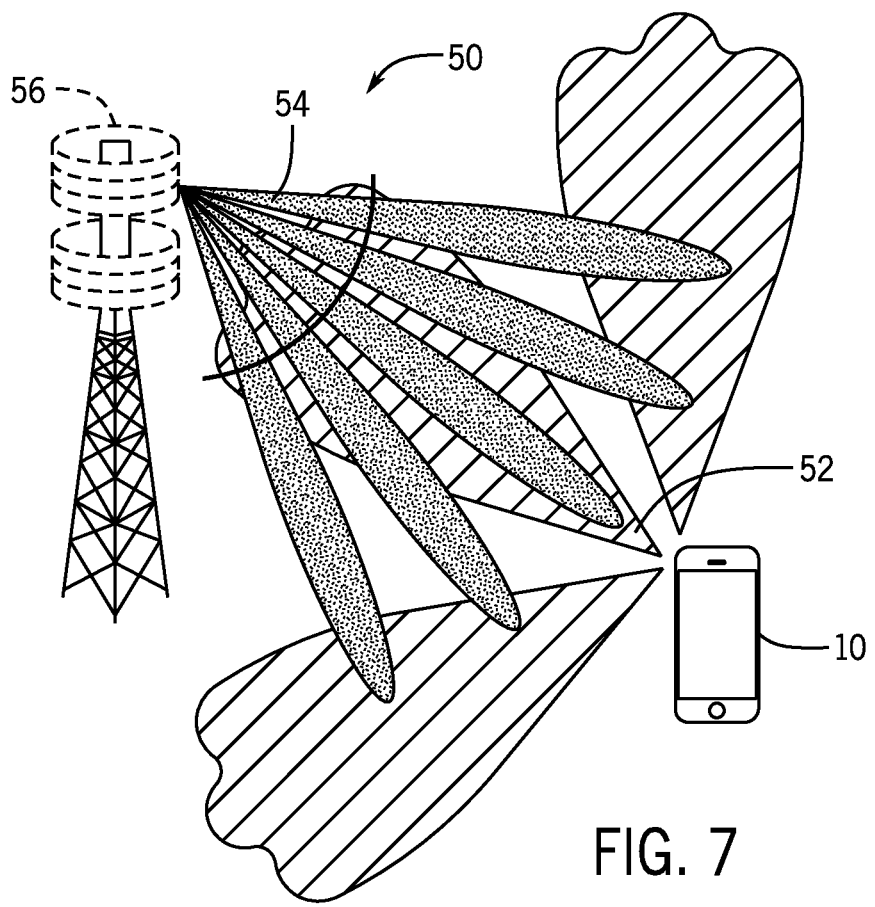
FIG. 7 is a diagram of a communication system that includes the electronic device 10 of FIG. 1 using coarse beams to locate a base station beam, according to embodiments of the present disclosure.

With the foregoing in mind, FIG. 7 is a diagram of a communication system 50 that includes the electronic device 10 of FIG. 1 using coarse beams 52 to locate a base station beam 54, according to embodiments of the present disclosure. As illustrated, a base station 56 may send multiple base station beams 54 (e.g., broadcast signals) for a communication device (e.g., a mobile terminal, which may include the electronic device 10) to sync, attach, and report to. In particular, the base station beams 54 may be in the mmWave frequency range (e.g., 24.25-300 GHz). The electronic device 10 may transmit wide- or large-beam width ("coarse") beams 52 to search for the base stations beams 54. This is because the larger beam width may enable the coarse beam 52 to cover more space when searching for the base station beam 54, and reduce the number of times the beam may be switched to cover a different area. Beam-switching may use additional power (e.g., from the power source 28 of the electronic device 10), as well as processing power (e.g., of the processor 12). Moreover, because each beam may be provided from settings ("codewords") in a codebook stored in a radio frequency integrated circuit of the electronic device 10, and the larger beam width of the coarse beam 52 may reduce the number of beams used to search for a base station beam 54, the codewords stored in the codebook may also be reduced. This may result in decreasing memory usage in the radio frequency integrated circuit, and thus may enable a smaller physical blueprint of the radio frequency integrated circuit. Link adaptation time may also be reduced as the electronic device 10 adapts the coarse beam 52 to the base station beam 54, other transmitting beams, and so on.

When the electronic device 10 finds and selects a suitable base station beam 54 via its transmitted coarse beam 52, the electronic device 10 may "track" the base station beam 54 to transfer information with the base station 56. In particular, information may be in the form of data packets having header information and communication payload data. The header information may be used to setup, maintain, and/or enable communication between the electronic device 10 and the base station 56, while the communication payload data may include the "actual" information that is intended for transfer, such as user data.

Figure 8:
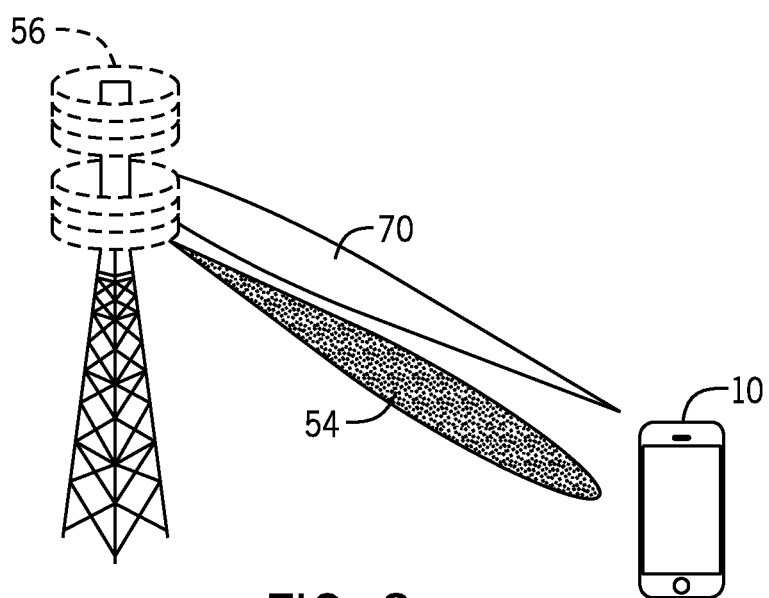
FIG. 8 is a diagram of the communication system of FIG. 7 that includes the electronic device of FIG. 1 using a fine beam to transfer information with a base station, according to embodiments of the present disclosure.

In some embodiments, the electronic device 10 may track the base station beam 54 using the coarse beam 52 used to search for the base station beam 54. In additional or alternative embodiments, the electronic device 10 may switch or change to emitting a fine beam to track the base station beam 54 and exchange information. For example, FIG. 8 is a diagram of the communication system 50 that includes the electronic device 10 of FIG. 1 using a fine beam 70 to transfer information with the base station 56, according to embodiments of the present disclosure. The fine beam 70 may be a narrow- or small-beam width ("fine") beam 70 that has a beam width less than the coarse beam 52, as the fine beam 70 may be used once the base station beam 54 has been located, and thus there is no advantage to having a wider or larger beam width.

Figure 9:
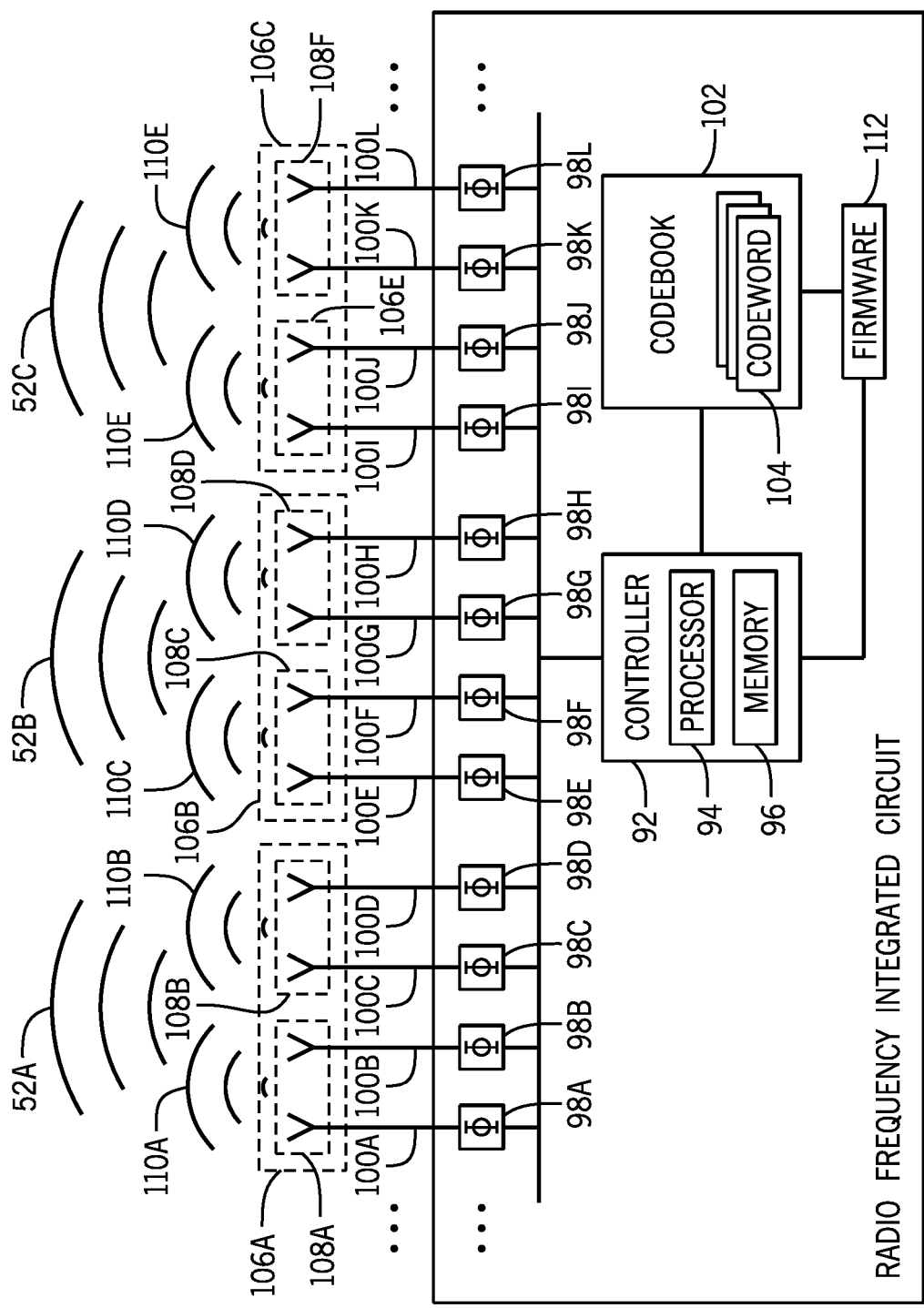
FIG. 9 is a radio frequency integrated circuit of the electronic device 10 of FIG. 1, according to embodiments of the present disclosure.

FIG. 9 is a radio frequency integrated circuit 90 of the electronic device 10 of FIG. 1, according to embodiments of the present disclosure. In particular, the radio frequency integrated circuit 90 may be part of the network interface 26 of the electronic device 10. The radio frequency integrated circuit 90 may include a controller 92 (e.g., a network controller) having one or more processors 94 (e.g., which may include a processor 12 illustrated in FIG. 1) and one or more memory and/or storage devices 96 (e.g., which may include a memory 14 and/or nonvolatile storage 16 device illustrated in FIG. 1). The one or more processors 94 (e.g., microprocessors) may execute software programs and/or instructions to generate coarse beams 52, track base station beams 54, and so on. Moreover, the one or more processors 94 may include multiple microprocessors, one or more "general-purpose" microprocessors, one or more special-purpose microprocessors, and/or one or more application specific integrated circuits (ASICS), or some combination thereof. For example, the one or more processors 94 may include one or more reduced instruction set (RISC) processors.

The one or more memory devices 96 may store information such as control software, look up tables, configuration data, etc. In some embodiments, the one or more processors 94 and/or the one or more memory devices 96 may be external to the controller 92 and/or the radio frequency integrated circuit 90. The one or more memory devices 96 may include a tangible, non-transitory, machine-readable-medium, such as a volatile memory (e.g., a random access memory (RAM)) and/or a nonvolatile memory (e.g., a read-only memory (ROM)). The one or more memory devices 96 may store a variety of information and may be used for various purposes. For example, the one or more memory devices 96 may store machine-readable and/or processor-executable instructions (e.g., firmware or software) for the one or more processors 94 to execute, such as instructions for generating coarse beams 52, tracking base station beams 54, and so on. The one or more memory devices 96 may include one or more storage devices (e.g., nonvolatile storage devices) that may include read-only memory (ROM), flash memory, a hard drive, or any other suitable optical, magnetic, or solid-state storage medium, or a combination thereof.

The controller 92 may be coupled to multiple phase shifters 98. Each phase shifter 98 may in turn be coupled to an antenna 100. The controller 92 may output a signal to the phase shifters 98 to cause the antennas 100 to emit radio frequency beams. In particular, the controller 92 may send the signal to apply a certain amount of input power to each phase shifter 98.

The controller 92 may be coupled to a codebook 102 that stores beam settings or codewords 104. Each codeword 104 may be a beamforming vector that specifies the beam that is generated by each antenna array 106. That is, each phase shifter 98 may control phases of a signal received from the controller 92 to cause a respective coupled antenna 100 to output a beam with a controlled phase. Each antenna 100 may output a beam corresponding to an exponential function having a phase value as an argument. A phase shifter 98 may control and/or vary that phase value based on receiving and implementing a codeword 104 via the controller 92 and the codebook 102, thus controlling the beam that is output by the respective coupled antenna 100. In this manner, the controller 92 may control or operate the antennas 100 to, for example, join a wireless communication network by tracking a base station beam 54.

The antennas 100 may be grouped into antenna arrays 106 based on the antennas' location in the electronic device 10 and/or proximity to other antennas 100. That is, antennas 100 may be in an antenna array 106 if the antennas 100 are within a threshold distance of each other. For example, the antenna array 106A includes four antennas 100A-D because the antennas 100A-D are within a threshold distance of each other.

Though three antenna arrays 106 having four antennas each (antenna array 106A has four antennas 100A-D, antenna array 106B has four antennas 100E-H, and antenna array 106C has four antennas 100I-L) are illustrated in the radio frequency integrated circuit 90 of FIG. 9, in additional or alternative embodiments, the radio frequency integrated circuit 90 may include any suitable number of antenna arrays 106 (e.g., 1 through 1000 antenna arrays) having any suitable number of antennas 100 (e.g., 1 through 1000 antennas). Moreover, each antenna array 106 may be disposed in a specific region of the electronic device 10 (e.g., the top, the bottom, a side, a front end, a back end, a corner, an edge, and so on), to enable a variety of directivity, as well as redundancy (e.g., if a user's hand blocks one antenna array 106A while holding the electronic device 10, possibly decreasing the power or gain of the outgoing beam, another antenna array 106B may not be blocked and be able to emit its outgoing beam with full power and/or efficiency). While the present disclosure relates to operating the antennas 100 in the mmWave frequency range (e.g., 24.25-300 GHz), it should be understood that operating the antennas with respect to any suitable frequency range is contemplated, such as multiple cellular frequency bands of approximately 380 megahertz (MHz), 410 MHz, 450 MHz, 480 MHz, 700 MHz, 710 MHz, 750 MHz, 800 MHz, 810 MHz, 850 MHz, 900 MHz, 1,500 MHz, 1,700 MHz, 1,800 MHz, 1,900 MHz, 2100 MHz, 2600 MHz, or 3500 MHz, Wi-Fi frequency bands of approximately 2.4 GHz or 5 GHz, and so on.

To decrease gain loss in a coarse beam 52, the controller 92 may apply the same high input power to each antenna 100. In some embodiments, the input power may be the largest or maximum input that the controller 92 may apply to the antennas 100 (e.g., without exceeding safety limitations (such as Maximum Permissible Exposure (MPE) limits adopted by the Federal Communications Commission)). This may enable the antennas 100 to emit a coarse beam 52 with high gain and/or decreased gain loss.

To increase the beam width of the coarse beam 52, the controller 92 may send codewords 104 to the phase shifters 98 that cause antennas 100 of each array 106 to form subarrays 108, and cause each subarray 108 to emit beams that combine in phase with (e.g., coherently add to) beams of other subarray(s) 108 to generate the coarse beam 52. In particular, antennas 100 of a subarray 108 may each output a beam corresponding to a respective exponential function having a phase value as an argument, and the respective exponential functions may initially be summed. At least some of these subarray exponential function summations may then be summed themselves to generate the coarse beam 52. Combining the beams in phase may include matching the phases of the beams to coherently add the power of each beam (and reduce or avoid destructive interaction between the beams) to generate the coarse beam 52 having increased power.

For example, as illustrated, the controller 92 may send a codeword 104 to phase shifters 98A-D that cause the antennas 100A-D of the array 106A to form two subarrays 108A-B, and cause the two subarrays 108A-B to emit beams 110A-B that combine in phase to generate the coarse beam 52A. Similarly, the controller 92 may send another codeword 104 to phase shifters 98E-H that cause the antennas 100E-H of the array 106B to form two subarrays 108C-D, and cause the two subarrays 108C-D to emit beams 110C-D that combine in phase to generate the coarse beam 52B. As illustrated, the controller 92 may send a further codeword 104 to phase shifters 98I-L that cause the antennas 100I-L of the array 106C to form two subarrays 108E-F, and cause the two subarrays 108E-F to emit beams 110E-F that combine in phase to generate the coarse beam 52C.

The radio frequency integrated circuit 90 may also include firmware 114 that is communicatively coupled to the controller 92 and the codebook 102. The controller 92 may control the firmware 114 to update, add, and/or remove the codewords 104 in the codebook 102.

Figure 10:
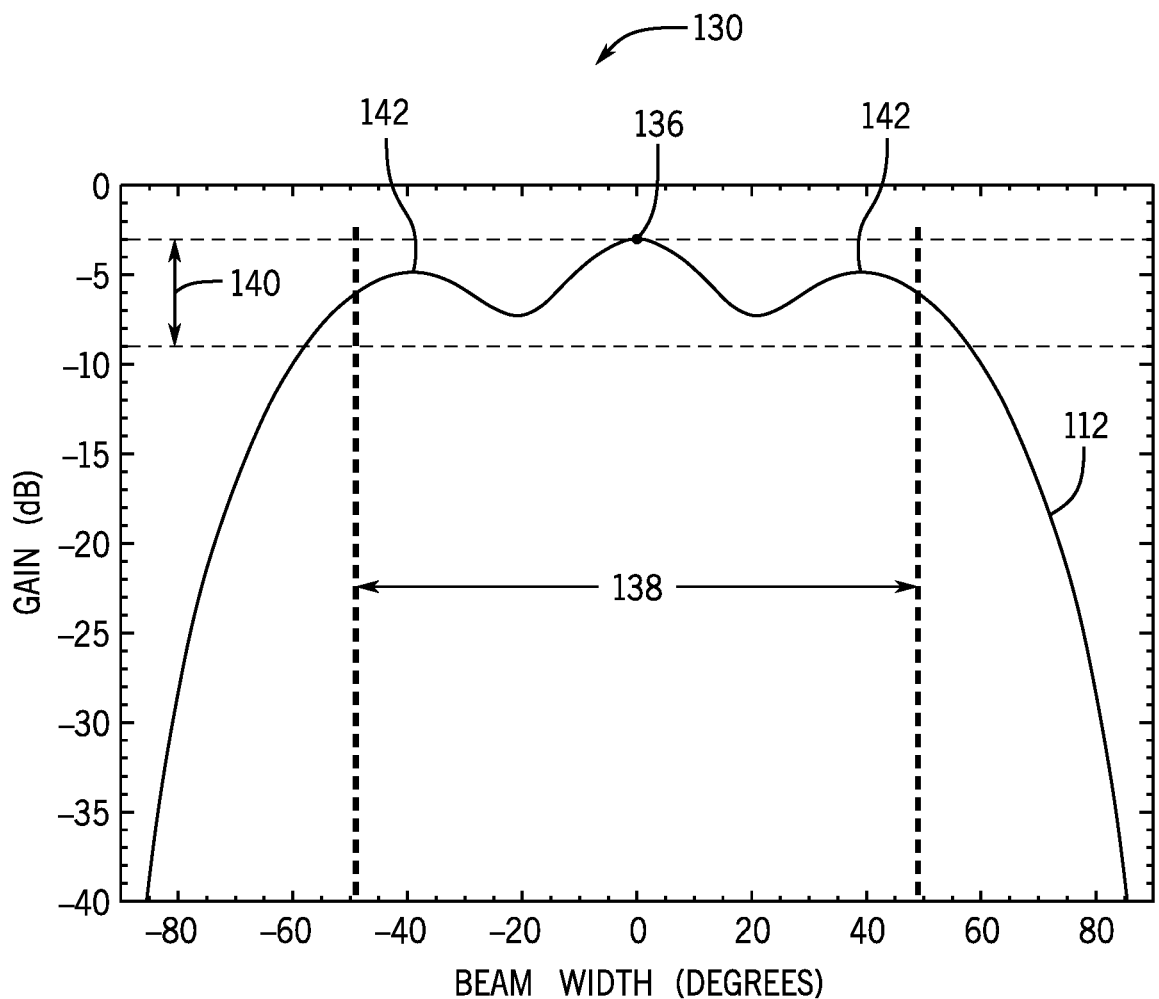
FIG. 10 is a plot of a coarse beam generated by an antenna array of FIG. 9, according to embodiments of the present disclosure.

Because the beams emitted by the subarrays 108 are combined in a certain phase, the generated coarse beam 52 may have increased beam width (while exhibiting a decreased gain loss due to the combining effect of the beams at this resulting phase setting). FIG. 10 is a plot 130 of the coarse beam 52 generated by an antenna array 106 of FIG. 9, according to embodiments of the present disclosure. The plot includes a horizontal axis 132 representing beam width of the coarse beam 52 in degrees, and a vertical axis 134 representing power gain of the coarse beam 52 in decibels. For instance, zero degrees on the horizontal axis 132 indicates the direction at which the coarse beam 52 is directed from the antenna array 106, while zero decibels on the vertical axis 134 indicates the peak power at peak directivity produced by a hypothetical lossless isotropic antenna array. The beam width may correspond to an azimuth angle (e.g., on a perpendicular plane with respect to gravity) with respect to the spherical coordinate system, where the zenith angle is constant, or a zenith angle (e.g., on a parallel plane with respect to gravity) where the azimuth angle is constant.

As illustrated, the coarse beam 52 has a peak gain 136 of −3 dB (e.g., in relation to a reference beam generated by applying the same input power to the antennas 100 of the antenna array 106, but not forming subarrays 108, such that each antenna 100 outputs a beam as a single antenna 100) and a beam width 138 of 104°. The beam width 138 of the coarse beam 52 may be measured at a threshold gain difference 140 from the peak gain 136 of the coarse beam 52.

In the plot 130, the threshold gain difference 140 is 6 dB. As such, the beam width 138 of the coarse beam 52 may be measured at −9 dB.

Additionally, the shape of the coarse beam 52, as a result of applying the same input power to each antenna 100 of the array 106 and causing the antennas 100 to form subarrays 108 that generate beams that combine in phase, include the wave or ripple, with the peak gain 136 as the high point. That is, the coarse beam 52 shape may be characterized as having a peak gain 136 at zero degrees (e.g., in the direction at which the coarse beam 52 is directed from the antenna array 106), as well as two lesser peak gains 142 that occur within the threshold gain difference 140 from the peak gain 136 (e.g., within the range of −3 dB to −9.0 dB).

Figure 11:
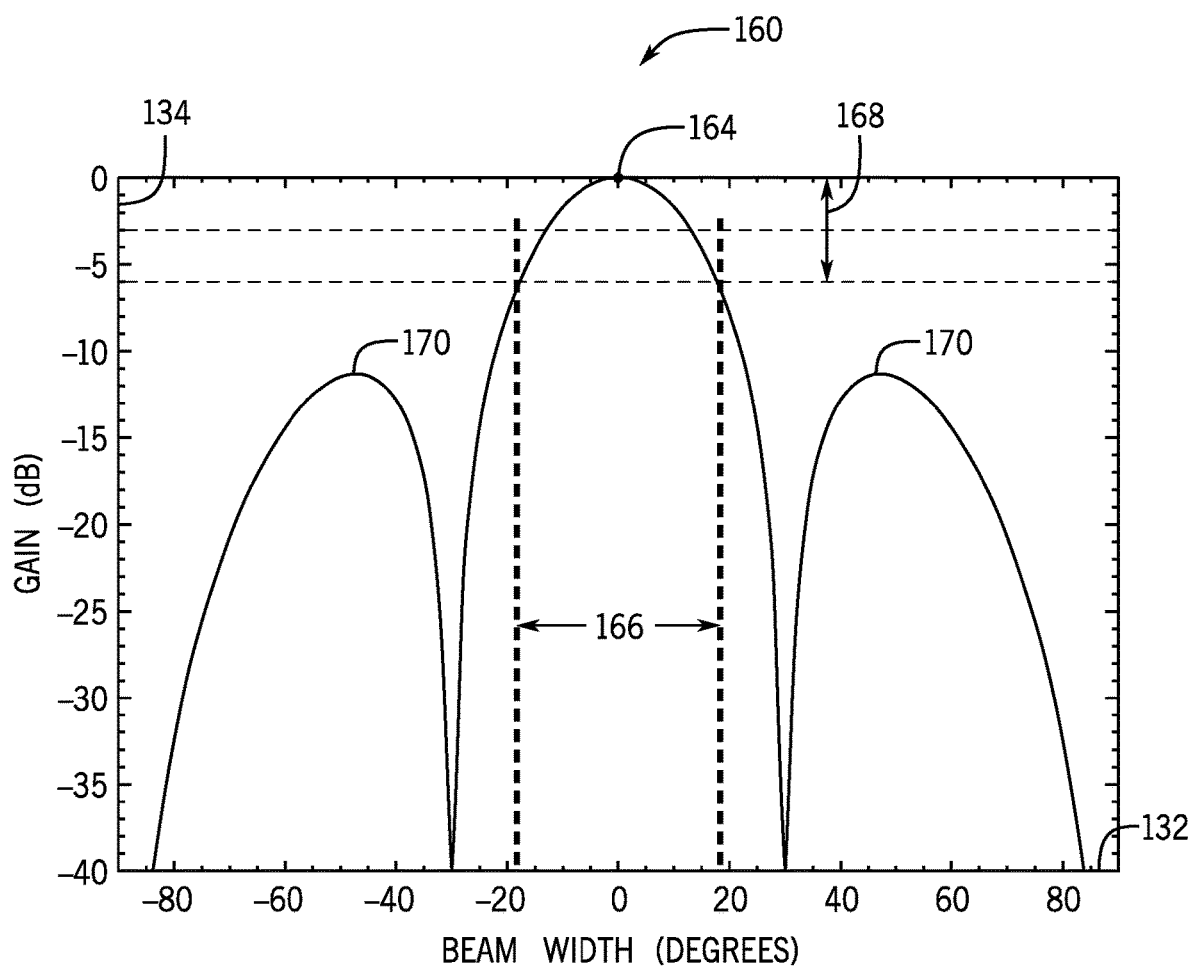
FIG. 11 is a plot of a reference beam generated by the antenna array of FIG. 9, where the antennas are not formed into subarrays, according to embodiments of the present disclosure.

The peak gain 136 and beam width 138 of the coarse beam 52 may be expressed in terms relative to a reference case of applying the same input power to the antennas 100 of the antenna array 106, but not forming subarrays 108 (e.g., such that each antenna 100 outputs a beam as a single antenna 100 of the antenna array 106). For example, FIG. 11 is a plot 160 of a reference beam 162 generated by the antenna array 106 of the radio frequency integrated circuit 90 of FIG. 9, where the antennas 100 are not formed into subarrays 108, according to embodiments of the present disclosure. As illustrated, the reference beam 162 is scaled to have a peak gain 164 of 0 dB. The reference beam 162 also has a beam width 166 of 36°. Like the beam width 138 of the coarse beam 52 shown in FIG. 10, the beam width 166 of the reference beam 162 may be measured by at a threshold gain difference 168 from the peak gain 164 reference beam 162. In the plot 160, as with the plot 130 of FIG. 10, the threshold gain difference 168 is 6 dB. As such, the beam width 166 of the reference beam 162 may be measured at −6 dB.

Notably, the shape of the reference beam 162, as a result of applying the same input power to each antenna 100 of the array 106 and having the antennas 100 emit beams singly and separately (as opposed to forming subarrays 108), only include the peak gain 164 (e.g., at zero degrees in the direction at which the reference beam 162 is directed from the antenna array 106), and not a lesser peak gain, within the threshold gain difference 168 from the peak gain 164 (e.g., within the range of 0 dB to −6 dB). Instead, lesser peak gains 170 are located at approximately −11.3 dB, well outside of the threshold gain difference 168 from the peak gain 164.

Figure 12:
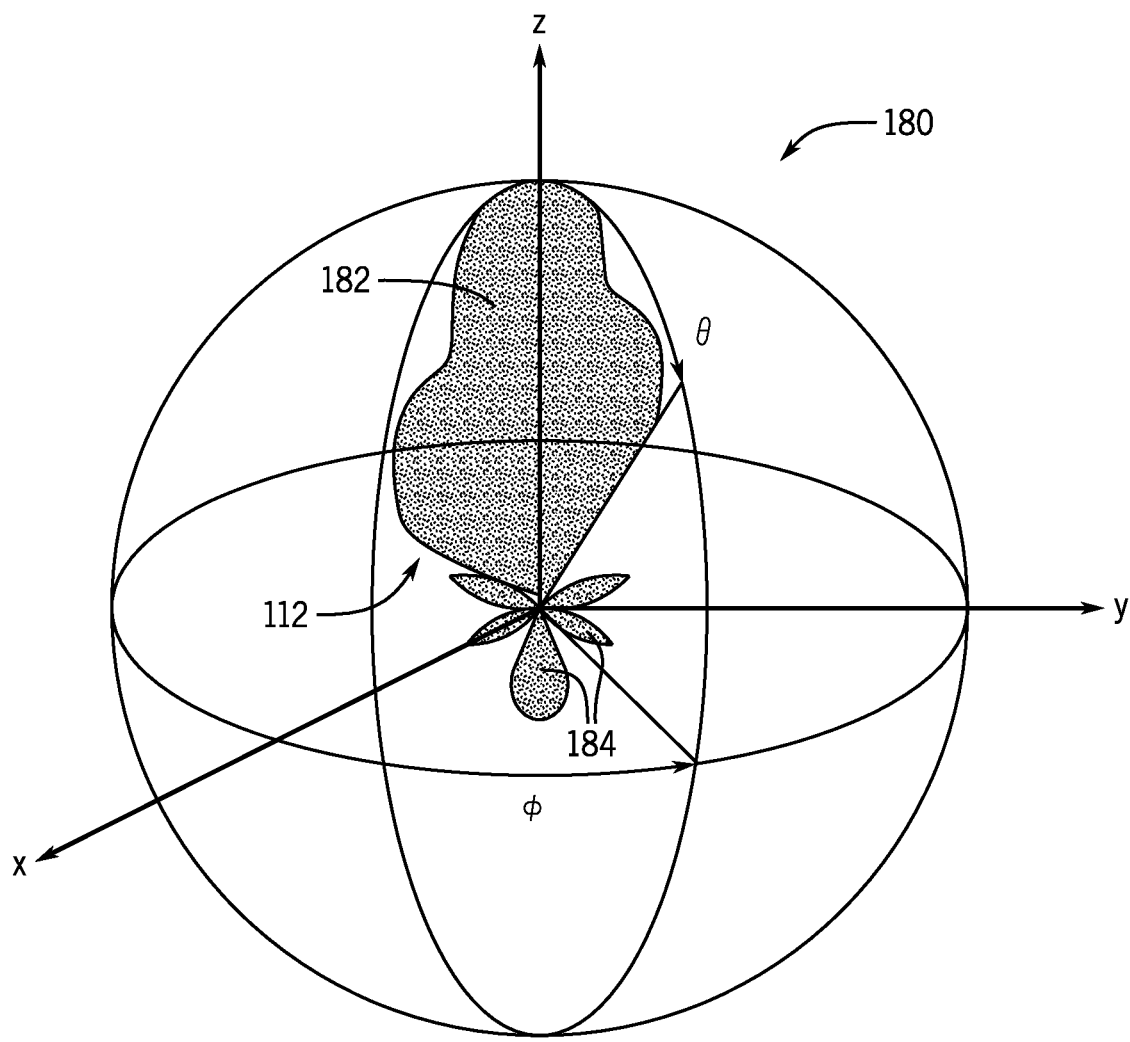
FIG. 12 is a plot of the coarse beam of FIG. 10 using a spherical coordinate system, according to embodiments of the present disclosure.

While any suitable number of antenna arrays 106 having any suitable number of antennas 100 is contemplated in the present disclosure, the three antenna arrays 106A-C having four antennas 100 each that generate the three coarse beams 52A-C may enable spherical coverage (e.g., full coverage of a spherical range) using 12-24 codewords 104 per antenna array 106. For example, FIG. 12 is a plot 180 of the coarse beam 52 of FIG. 10 generated by an antenna array 106 of the radio frequency integrated circuit 90 of FIG. 9 using a spherical coordinate system, according to embodiments of the present disclosure. The coarse beam 52 is illustrated as corresponding to an azimuth angle θ indicated on the plane defined by the x-axis and the z-axis of the plot 180 (e.g., perpendicular to the direction of gravity), where the zenith angle φ indicated on the plane defined by the x-axis and the y-axis of the plot 180 (e.g., parallel to the direction of gravity) is constant (e.g., zero degrees). It should be understood that the coarse beam 52 may have a non-zero y-axis component such that the zenith angle φ is a range of degree values, and that the zenith angle φ is illustrated as constant in the plot 180 for illustrative purposes.

Moreover, the coarse beam 52 illustrated in the plot 130 of FIG. 10 may correspond to the main lobe 182 of the coarse beam 52, as the coarse beam 52 may also exhibit minor (e.g., side and/or rear) lobes 182, as seen in the plot 180 of FIG. 12. Due to the broad beam width of the coarse beam 52, as little as 36-72 codewords 104 may be stored in the codebook 102 corresponding to coarse beams 112 to be emitted by one or more antenna arrays 106. As an example, if the electronic device 10 includes three antenna arrays 106 each having four antennas 100, the codebook 102 may store 12-24 codewords 104 for each antenna array 106 for generating the coarse beams 112.

As such, beam-switching (between coarse beams 112) may be reduced or altogether unnecessary when attempting to detect a base station beam 54, thus decreasing detection time and/or link adaptation time. Moreover, it may take less codewords 104 to enable spherical coverage, reducing the size of the codebook 102 of the radio frequency integrated circuit 90, and thus the size of the radio frequency integrated circuit 90. That is, each codeword 104 may take a certain amount of memory space to store in the codebook 102, and reducing the number of codewords 104 corresponding to coarse beams 112 may result in requiring less memory space in the codebook 102 devoted to storing codewords 104, and thus a smaller radio frequency integrated circuit 90.

Figure 13:
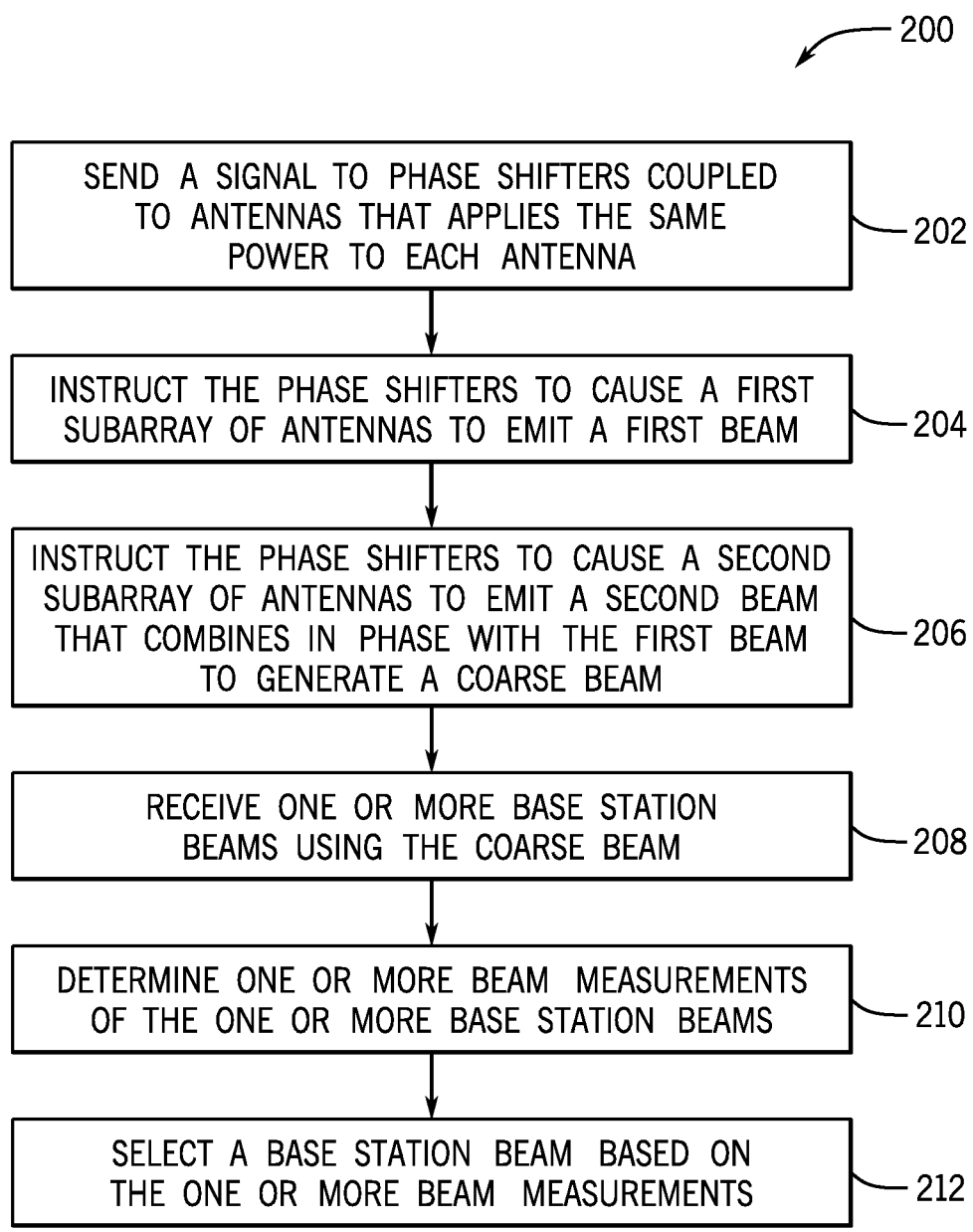
FIG. 13 is a flowchart illustrating a method for generating a coarse beam to find and select a base station beam, according to embodiments of the present disclosure.

FIG. 13 is a flowchart illustrating a method 200 for generating a coarse beam 52 to find and select a base station beam 54, according to embodiments of the present disclosure. The method 200 may be performed by any suitable device that may control components of the radio frequency integrated circuit 90 and the antennas 100 of the electronic device 10 of FIG. 9, such as the controller 92, the codebook 102, and so on. While the method 200 is described using steps in a specific sequence, it should be understood that the present disclosure contemplates that the described steps may be performed in different sequences than the sequence illustrated, and certain described steps may be skipped or not performed altogether. In some embodiments, the method 200 may be implemented by executing instructions stored in a tangible, non-transitory, computer-readable medium, such as the one or more memory devices 96, using a processor, such as the one or more processors 94.

As illustrated, in process block 202, the processor 94 sends a signal to the phase shifters 98 coupled to the antennas 100 that applies the same input power to each antenna 100. That is, the processor 94 may select certain antennas 100 to emit beams of a certain gain. The certain antennas 100 may be grouped into one or more arrays 106. For example, as shown in FIG. 9, the processor 94 selects the antennas 100A-D of the array 106A by sending the signal to the phase shifters 98A-D.

In process block 204, the processor 94 instructs the phase shifters 98 to cause a first subarray 108 of antennas 100 to emit a first beam 110. In particular, the phase shifters 98 may control the antennas 100 of the first subarray 108 to each output a beam corresponding to a respective exponential function having a certain phase value as an argument, and the respective exponential functions may be summed. In some cases, the signal sent by the processor 94 in process block 202 may provide the instructions to the phase shifters 98 to cause the first subarray 108 of antennas to emit the first beam 110. For example, as shown in FIG. 9, the processor 94 instructs the phase shifters 98A-B to cause the antennas 100A-B of the first subarray 108A to emit the first beam 110A, which may be represented as a summation of the respective exponential functions of the beams emitted by the antennas 100A-B.

In process block 206, the processor 94 instructs the phase shifters 98 to cause a second subarray 108 of antennas 100 to emit a second beam 110 that combines in phase with the first beam 110 to generate a coarse beam 52. In particular, the phase shifters 98 may control the antennas 100 of the second subarray 108 to each output a beam corresponding to a respective exponential function having a certain phase value as an argument, and the respective exponential functions may be summed. The first beam 110 may be combined in phase (e.g., coherently added) to the second beam 110. Combining the beams 110 in phase may include matching the phases of the beams 110 to coherently add the power of the beams 110 (and reduce or avoid destructive interaction between the beams 110) to generate the coarse beam 52 having increased power. In some cases, the signal sent by the processor 94 in process block 202 may provide the instructions to the phase shifters 98 to cause the second subarray 108 of antennas to emit the second beam 110.

For example, as shown in FIG. 9, the processor 94 instructs the phase shifters 98C-D to cause the antennas 100C-D of the second subarray 108B to emit the second beam 110B, which may be represented as a summation of the respective exponential functions of the beams emitted by the antennas 100C-D. The first and second beams 110A-B combine in phase to generate the coarse beam 52A. In some embodiments, the electronic device 10 may include multiple arrays 106, and may generate multiple coarse beams 52 using multiple arrays 106, such as the multiple coarse beams 52A-C using the multiple antenna arrays 106A-C.

In process block 208, the processor 94 receives one or more base station beams 54 using the coarse beam 52. In particular, the processor 94 may use the coarse beam 52 to search for available base station beams 54, and may receive indications of the base stations beams 54 via the coarse beam 52.

In process block 210, the processor 94 determines one or more beam measurements of the one or more base station beams 54. In particular, the processor 94 may evaluate the base station beams 54 to determine the base station beam 54 that has the strongest connection to the coarse beam 52. In some embodiments, the processor 94 may determine signal strength of the base station beam 54, signal-to-noise ratio of the base station beam 54, and/or any other suitable measure of connection between the base station beam 54 and the coarse beam 52.

In process block 212, the processor 94 selects a base station beam 54 based on the one or more beam measurements. That is, the processor 94 evaluates the one or more beam measurements and selects the base station beam 54 that may provide the best communication channel (e.g., has the best signal strength and/or signal-to-noise ratio). In some embodiments, the processor 94 may generate a score for each base station beam 54 by assigning weights to each beam measurement, applying the weights, and selecting the base station beam 54 with the highest score. In this manner, the method 200 may enable the processor 94 to generate a coarse beam 52 to find and select a base station beam 54.

Figure 14:
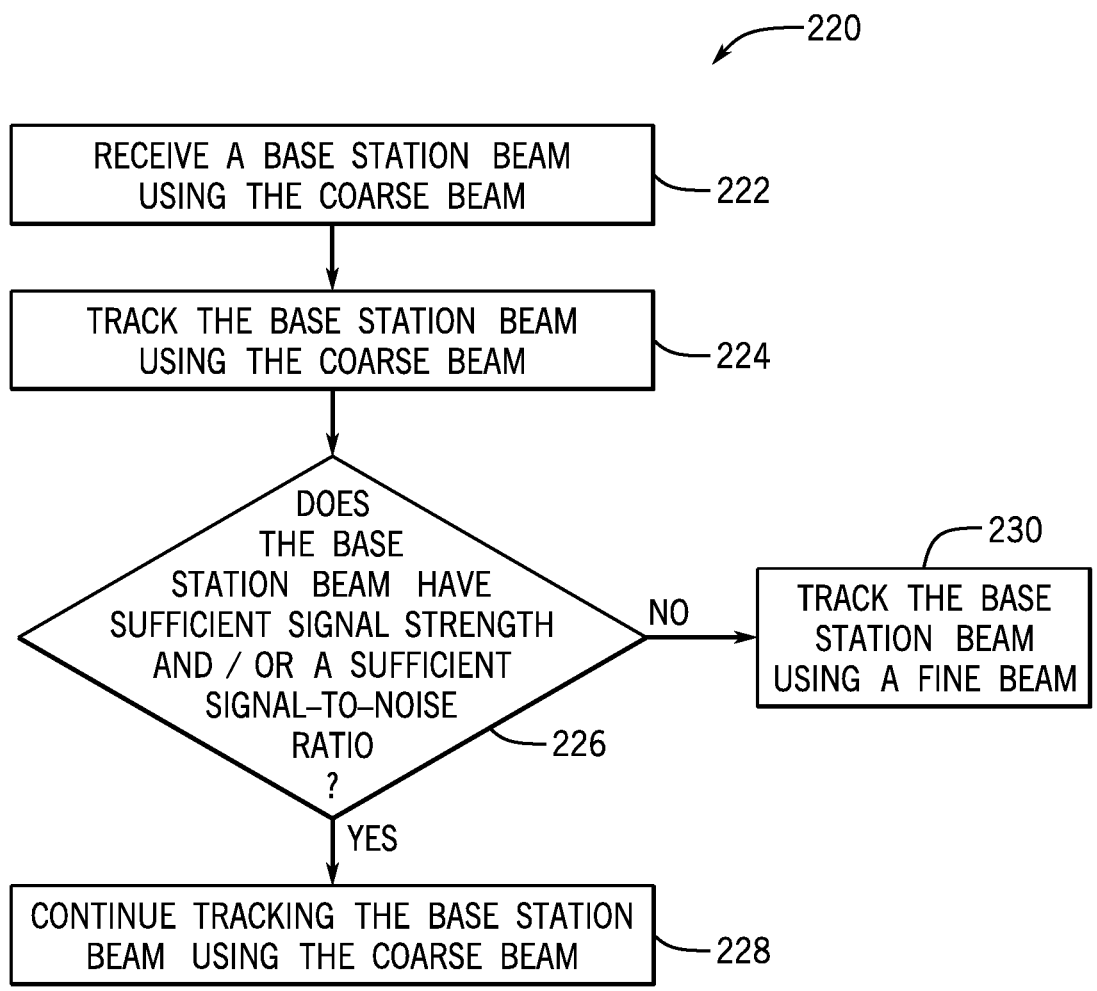
FIG. 14 is a flowchart illustrating a method for tracking a base station beam using a coarse beam, according to embodiments of the present disclosure.

While the processor 94 may switch or change to emitting the fine beam 70 to track the base station beam 54 as shown in FIG. 8, in some cases, the processor 94 may continue tracking the base station beam 54 using the coarse beam 52. In particular, FIG. 14 is a flowchart illustrating a method 220 for tracking the base station beam 54 using the coarse beam 52, according to embodiments of the present disclosure. The method 220 may be performed by any suitable device that may control components of the radio frequency integrated circuit 90 and the antennas 100 of the electronic device 10 of FIG. 9, such as the controller 92, the codebook 102, and so on. While the method 220 is described using steps in a specific sequence, it should be understood that the present disclosure contemplates that the described steps may be performed in different sequences than the sequence illustrated, and certain described steps may be skipped or not performed altogether. In some embodiments, the method 200 may be implemented by executing instructions stored in a tangible, non-transitory, computer-readable medium, such as the one or more memory devices 96, using a processor, such as the one or more processors 94.

As illustrated, in process block 222, the processor 94 receives the base station beam 54 using the coarse beam 52. In particular, the processor 94 may receive the base station beam 54 after performing at least some of the process blocks 202-206 of the method 200 of FIG. 13.

In process block 224, the processor 94 tracks the base station beam 54 using the coarse beam 52. In some cases, the processor 94 may select the base station beam 54 from multiple received base stations beams 54 based on one or more beam measurements as described in process blocks 208-212 of the method 200 of FIG. 13. Tracking the beam may include storing a location and/or direction of the base station beam 54 and/or base station 56, operational characteristics or parameters of the base station beam 54 and/or base station 56, maintaining a communication channel with the base station beam 54, and so on.

In process block 226, the processor 94 determines whether the base station beam 54 has sufficient signal strength and/or a sufficient signal-to-noise ratio when using the coarse beam 52. That is, the processor 94 may determine the signal strength of the base station beam 54, compare the signal strength to a threshold signal strength, and determine whether the signal strength exceeds the threshold signal strength. Similarly, the processor 94 may determine the signal-to-noise ratio of the base station beam 54, compare the signal-to-noise ratio to a threshold signal-to-noise ratio, and determine whether the signal-to-noise ratio exceeds the threshold signal-to-noise ratio. The processor 94 may make similar comparisons for any other suitable measurements of the base station beam 54 to determine the quality of communication using the coarse beam 52.

If the processor 94 determines that the base station beam 54 does not have sufficient signal strength and/or a sufficient signal-to-noise ratio when using the coarse beam 52, then, in process block 230, the processor 94 switches to the fine beam 70 to track the base station beam 54. The fine beam 70 may be a narrow- or small-beam width ("fine") beam 70 that has a beam width less than the coarse beam 52, as the fine beam 70 may be used once the base station beam 54 has been located, and thus there is no advantage to having a wider or larger beam width. While, in some cases, the fine beam 70 may be advantageous as the narrower beam width may enable less interference in the communication channel established between the fine beam 70 and the base station beam 54, it should be understood that there may be no power difference between emitting the fine beam 70 and the coarse beam 52, as generating the narrower beam width of the fine beam 70 may be a matter of adjusting one or more phases of one or more beams emitted by one or more antennas 100, and not adjusting input power to the antennas 100.

If the processor 94 determines that the base station beam 54 has sufficient signal strength and/or a sufficient signal-to-noise ratio when using the coarse beam 52, then, in process block 228, the processor 94 continues tracking the base station beam 54 using the coarse beam 52. As such, the processor 94 may transfer information with the base station 56 using the coarse beam 52, including communication payload data (e.g., having user data). That is, the processor 12 may not switch to a fine beam 70 to transfer information with the base station 56. Advantageously, this reduces the time and any processing resources used to enable a user to establish communication with the base station 56 as the processor 94 does not switch from the coarse beam 52 to the fine beam 70. Moreover, using the coarse beam 52 to track the base station beam 54 may decrease sensitivity to and/or the likelihood of losing a communication link to the base station 56 via the base station beam 54 due to sudden and/or fast movements. That is, the increased beam width of the coarse beam 52 results in broader coverage space, which may tolerate sudden and/or faster movements in orientation with less adjustments needed by the processor 94 to maintain the appropriate beam direction to establish the communication link with the base station 56. In this manner, the method 220 may enable the processor 94 to track a base station beam 54 using a coarse beam 52.

The specific embodiments described above have been shown by way of example, and it should be understood that these embodiments may be susceptible to various modifications and alternative forms. For example, the methods may be applied for embodiments having different numbers and/or locations for antennas, different groupings, and/or different networks. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A communication device comprising:
one or more antenna arrays comprising a plurality of antennas;
a radio frequency integrated circuit comprising:
a plurality of phase shifters, wherein each phase shifter of the plurality of phase shifters is coupled to a respective antenna of the plurality of antennas; and
a codebook configured to store a plurality of codewords, wherein each codeword is configured to cause the plurality of phase shifters to control phases of a signal received by the plurality of phase shifters; and
a controller coupled to the radio frequency integrated circuit, wherein the controller is configured to:
send the signal to the plurality of phase shifters, wherein the signal is configured to apply a same input power to each antenna of the plurality of antennas; and
send a codeword of the plurality of codewords to the plurality of phase shifters, wherein the signal and the codeword are configured to cause a first subarray of antennas of the plurality of antennas to emit a first beam and cause a second subarray of antennas of the plurality of antennas to emit a second beam, wherein the first beam is configured to combine in phase with the second beam to generate a coarse beam having a beam width at least 2.5 times that of a reference beam width of a reference beam that is generated by applying the same input power to each antenna of the plurality of antennas when the plurality of antennas are configured to emit respective beams singly and separately.

2. The communication device of claim 1, wherein the beam width is measured at a threshold gain difference from a peak gain of the coarse beam, and wherein the reference beam width is measured at the threshold gain difference from a peak gain of the reference beam.

3. The communication device of claim 2, wherein the threshold gain difference is 6 decibels.

4. The communication device of claim 2, wherein the peak gain is in a direction at which the coarse beam is directed, wherein the coarse beam comprises a plurality of lesser peak gains in directions different than the direction at which the coarse beam is directed.

5. The communication device of claim 4, wherein the peak gain and the plurality of lesser peak gains occur within the threshold gain difference from the peak gain of the coarse beam.

6. The communication device of claim 1, wherein the beam width is between 100° and 110°, wherein the reference beam width is between 30° and 40°.

7. The communication device of claim 1, wherein the beam width is approximately 104°, and wherein the reference beam width is approximately 36°.

8. The communication device of claim 1, wherein a peak gain of the coarse beam is at most 3.5 decibels less than a peak gain of the reference beam.

9. The communication device of claim 1, wherein a peak gain of the coarse beam is approximately −3 decibels when a peak gain of the reference beam is scaled to 0 decibels.

10. The communication device of claim 1, wherein the coarse beam comprises a frequency between 24.25 gigahertz and 300 gigahertz.

11. A radio frequency integrated circuit comprising:
a plurality of phase shifters, wherein each phase shifter of the plurality of phase shifters is configured to couple to a respective antenna of an antenna array, wherein the antenna array comprises a plurality of antennas; and
a codebook configured to store a plurality of codewords, wherein a set of codewords of the plurality of codewords is configured to cause the plurality of phase shifters to control phases of a signal received by the plurality of phase shifters, wherein the set of codewords is configured to cause a first subarray of antennas of the plurality of antennas to emit a first beam and cause a second subarray of antennas of the plurality of antennas to emit a second beam, wherein the plurality of codewords enables spherical coverage, wherein a number of codewords of the plurality of codewords stored in the codebook is less than or equal to 72, wherein the first beam is configured to coherently add to the second beam to generate a coarse beam that comprises a main lobe having:
a maximum peak gain in a main direction at which the coarse beam is directed;
a plurality of lesser peak gains in lesser directions different from the main direction.

12. The radio frequency integrated circuit of claim 11, wherein a number of codewords of the plurality of codewords stored in the codebook is less than or equal to 36.

13. The radio frequency integrated circuit of claim 11, comprising:
- a second plurality of phase shifters, wherein each phase shifter of the second plurality of phase shifters is configured to couple to a second respective antenna of a second antenna array, wherein the second antenna array comprises a second plurality of antennas; and
- a third plurality of phase shifters, wherein each phase shifter of the third plurality of phase shifters is configured to couple to a third respective antenna of a third antenna array, wherein the third antenna array comprises a third plurality of antennas.

14. The radio frequency integrated circuit of claim 13, wherein the codebook is configured to store:
- a second set of codewords of the plurality of codewords of the codebook is configured to cause the second plurality of phase shifters to control second phases of the signal received by the second plurality of phase shifters; and
- a third set of codewords of the plurality of codewords of the codebook is configured to cause the third plurality of phase shifters to control third phases of the signal received by the third plurality of phase shifters.

15. The radio frequency integrated circuit of claim 14, wherein a number of codewords of the set of codewords is less than or equal to 24, a number of codewords of the second set of codewords is less than or equal to 24, and a number of codewords of the third set of codewords is less than or equal to 24.

16. The radio frequency integrated circuit of claim 14, wherein a number of codewords of the set of codewords is less than or equal to 12, a number of codewords of the second set of codewords is less than or equal to 12, and a number of codewords of the third set of codewords is less than or equal to 12.

17. One or more tangible, non-transitory, machine-readable-medium, comprising machine-readable instructions that cause a processing device to:

- send a signal to a plurality of phase shifters of a radio frequency integrated circuit, wherein each phase shifter of the plurality of phase shifters is coupled to a respective antenna of a plurality of antennas, and wherein the signal is configured to apply a same input power to each antenna of the plurality of antennas; and
- send a codeword of a plurality of codewords stored in a codebook to the plurality of phase shifters, wherein each codeword is configured to cause the plurality of phase shifters to control phases of the signal received by the plurality of phase shifters, wherein the signal and the codeword are configured to cause a first subarray of antennas of the plurality of antennas to emit a first beam and cause a second subarray of antennas of the plurality of antennas to emit a second beam, wherein the first beam is configured to combine in phase with the second beam to generate a coarse beam having a beam width at least 2.5 times that of a reference beam width of a reference beam that is generated by applying the same input power to each antenna of the plurality of antennas when the plurality of antennas are configured to emit respective beams singly and separately.

18. The one or more tangible, non-transitory, machine-readable-medium of claim 17, wherein the plurality of codewords enables spherical coverage.

19. The one or more tangible, non-transitory, machine-readable-medium of claim 17, wherein a number of codewords of the plurality of codewords stored in the codebook is less than or equal to 72.

20. The one or more tangible, non-transitory, machine-readable-medium of claim 17, wherein the coarse beam comprises:
- a main lobe having a maximum peak gain in a main direction at which the coarse beam is directed; and
- a plurality of lesser peak gains in lesser directions different from the main direction.

* * * * *